United States Patent
Nasu et al.

(10) Patent No.: US 7,600,034 B2
(45) Date of Patent: Oct. 6, 2009

(54) DATA DELIVERY DEVICE THAT DETERMINES A DESTINATION FOR DELIVERY BASED ON ESTIMATED TRANSMISSION TIME AND LOCATION OF A CLIENT

(75) Inventors: Kazunori Nasu, Yokohama (JP); Masato Takeichi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 892 days.

(21) Appl. No.: 11/114,005

(22) Filed: Apr. 26, 2005

(65) Prior Publication Data
US 2005/0249175 A1 Nov. 10, 2005

(30) Foreign Application Priority Data
Apr. 27, 2004 (JP) ............................ P2004-131998

(51) Int. Cl.
G06F 15/16 (2006.01)
(52) U.S. Cl. ............... 709/232; 709/217; 455/456.1
(58) Field of Classification Search ......... 709/217–219, 709/232, 235, 238, 239; 455/419, 445, 456.1; 370/229, 234, 237, 238; 701/200–226
See application file for complete search history.

(56) References Cited

U.S. PATENT DOCUMENTS

| 6,134,596 | A | 10/2000 | Bolosky et al. |
| 6,336,142 | B1 | 1/2002 | Kato et al. |
| 7,072,670 | B2 * | 7/2006 | Sato et al. ............... 455/456.1 |
| 2002/0094815 | A1 * | 7/2002 | Kanerva ..................... 455/445 |
| 2003/0078986 | A1 * | 4/2003 | Ayres et al. ................. 709/217 |
| 2004/0010553 | A1 | 1/2004 | Katz et al. |

FOREIGN PATENT DOCUMENTS

| CN | 1663297 A | 8/2005 |
| JP | 2000-339276 | 12/2000 |
| JP | 2002-7280 | 1/2002 |
| JP | 2002-49556 | 2/2002 |
| JP | 2002-77305 | 3/2002 |
| JP | 2003-99449 | 4/2003 |
| JP | 2003-156342 | 5/2003 |
| JP | 2003-283689 | 10/2003 |
| JP | 2003-330916 | 11/2003 |
| WO | WO 2004/062114 A2 | 7/2004 |

* cited by examiner

*Primary Examiner*—Nathan J Flynn
*Assistant Examiner*—James E Conaway
(74) *Attorney, Agent, or Firm*—Oblon, Spivak, McClelland, Maier & Neustadt, L.L.P.

(57) ABSTRACT

A data delivery device includes a storage unit for storing data, a receiving unit for receiving, from a client terminal, a request to download data to be stored into the storage unit and information indicative of a present position of the client terminal, through a network. The data delivery device also includes a judging unit for judging, in response to the download request received by the receiving unit, whether data to be stored into the storage unit is to be transmitted to the client terminal or to another predetermined terminal on the basis of a present position of the client terminal, and a delivery unit for delivering the data to a terminal destination based on the result of the judgment.

7 Claims, 7 Drawing Sheets

Fig.7

| GPS INFORMATION | PREVIOUS DAY TIME |
|---|---|
| N36.14.63.4 E135.16.44.8 (A POINT) | 16:45:00 |
| N36.14.65.3 E135.16.48.7 (B POINT) | 16:46:00 |
| N36.14.68.2 E135.16.46.5 (C POINT) | 16:47:00 |
|  |  |
| ... | ... |
|  |  |
| N36.14.40.2 E135.16.38.5 (HOME) | 17:30:00 |

DATA DELIVERY DEVICE THAT DETERMINES A DESTINATION FOR DELIVERY BASED ON ESTIMATED TRANSMISSION TIME AND LOCATION OF A CLIENT

BACKGROUND OF THE INVENTION

1. Field of the Invention

The present invention relates to a data delivery device and a method for delivering data to a mobile device such as a cellular phone.

2. Related Background of the Invention

The inventions disclosed in Japanese Patent Application Laid-open Nos. 2003-330916 and 2003-339276 as publications of Unexamined Patent Applications in Japan, are known for the data delivery device which delivers data to a mobile device as a client terminal in accordance with a position of the mobile device. Japanese Patent Application Laid-open No. 2003-330916 discloses that a server delivers to the mobile device regional proper noun dictionary data to a mobile device in accordance with a present position of the mobile device, and upon receipt of the dictionary data, the mobile device carries out an appropriate process by using the dictionary data Japanese Patent Application Laid-open No. 2003-339276 discloses that a server delivers a file to be highly possibly accessed to a mobile device in accordance with a present position of the mobile device, whereby realizing a convenient device.

A technology disclosed in Japanese Patent Application Laid-open No. 2003-283689 is known for an information base station (delivery device) which transmits information, in accordance with a present position of a mobile device, to another mobile device. Japanese Patent Application Laid-open No. 2003-283689 discloses that in accordance with a present position of a mobile device, the delivery device transmits predetermined information to a designated transmission destination (for example, a place where a user having a mobile device will visit).

SUMMARY OF THE INVENTION

Those patent documents disclose the invention to download data to the mobile device, and the invention to transmit data to the predetermined transmission destination in accordance with a position of the mobile device. However, it is impossible to change the download destination (transmission destination) to which the data is downloaded, with an instruction of the user using the mobile device. The data to be downloaded is large in amount, the mobile device is exclusively used by the downloading operation and hence, is inconvenient in use. It is considered that a user will designate to freely change a download destination. In recent device environment allowing the mobile device to be connected to a personal computer at home for data exchange, it is more preferable to download the data into a personal computer or another communication device located at home since the mobile device is not exclusively used by the downloading operation. However, sometimes the user desires to get and use data as soon as possible. In such a case, it is not preferable that large-sized data is across-the-board downloaded into the personal computer at home.

Accordingly, an object of the present invention is to a data delivery device and a data delivery method which enable the user to get data at a client terminal that the user keeps close at hand, while being free from such a disadvantage that a client terminal issuing a download request is exclusively used for a long time by the downloading operation.

To achieve the above object, there is provided a data delivery device, the data delivery device includes: storage means for storing data; receiving means for receiving, from a client terminal, a request to download data to be stored into the storage means and information indicative of a present position of the client terminal, through the network; judging means for judging, in response to the download request received by the receiving means, whether data to be stored into the storage means is to be transmitted to the client terminal or to another predetermined terminal on the basis of a present position of the client terminal; and delivery means for delivering the data to a terminal destination based on the result of judgment which is made by the judging means.

According to another aspect of the invention, there is provided a method for delivering data, the method includes the steps of receiving a data download request from the client terminal through a network, judging, in response to the received download request, as to whether the received data is to be transmitted to the client terminal or another predetermined terminal on the basis of a present position of the client terminal; and delivering the data to the terminal based on the judgment result.

In the data delivery device and method, the present positions of a mobile body are managed. Data is delivered to the client terminal or another terminal on the basis of a position of the mobile body without a disadvantage that the client terminal is exclusively used by the data downloading operation.

The judging means of the data delivery device includes comparing means for comparing a data delivering time continued till completion of delivering the data to be delivered to the client terminal with a movement time taken for the client terminal to move and arrive at another predetermined terminal, and determining means for determining that the data is delivered to the another predetermined terminal being different from the client terminal when the comparing means judges that the data delivering time is longer than the movement time, and that the data is delivered to the client terminal when the comparing means judges that the data delivering time is shorter than the movement time.

In the arrangement mentioned above, a movement time taken for the client terminal to movement to the predetermined terminal is compared with a delivery time for the data delivery to the client terminal. When it is judged that the delivery time is longer than the movement time, data is downloaded into the predetermined terminal. When arriving at the predetermined terminal, the client terminal connects itself to the predetermined terminal and extracts data from the predetermined terminal. Therefore, such a disadvantage that the client terminal is exclusively used for a long time by the downloading operation is successfully eliminated without changing a time continued till the client terminal that the user keeps close at hand obtains data or with reduction of the data obtaining time.

When it is judged that the delivery time is shorter than the movement time, data is downloaded into the client terminal. The client terminal is not exclusively used for a long time by the downloading operation is successfully eliminated, and data is quickly delivered to the client terminal.

The data delivery device of the invention further includes network status managing means for statistically managing a congestion status in a transmission channel every time zone, the comparing means comparing the moving time with a delivery time set up in consideration of a delay time, which is obtained in a manner that a delay time based on the congestion status in the transmission channel under management of the network status managing means is added to the delivery time.

In the arrangement mentioned above, a delivery time that is set up in consideration of a delay time in the network is calculated by using the network status managing means. The delivery time thus calculated is compared with the movement time. Therefore, a more practical delivery time is used for the comparing operation, so that a delivery destination which enables one to obtain data at the client terminal more reliably and quickly, is determined.

The judging means of the data delivery device includes comparing means for comparing a first delivery time continued till completion of delivering the data to be delivered to the client terminal with the longer of a movement time till the client terminal moves to a predetermined terminal and a second delivery time continued till completion of delivering data to the predetermined terminal and determining means for delivering data to the predetermined terminal when the comparing means judges that the first delivery time is longer than the longer of the movement time and the second delivery time, and for delivering data to the client terminal when the comparing means judges that the first delivery time is shorter than the longer of the movement time and the second delivery time.

In the judging means thus constructed, the movement time taken for the client terminal to move from a present position of the client terminal to a position of the predetermined terminal or the delivery time taken for data to be delivered to the predetermined terminal is compared with the delivery time taken for data to be delivered to the client terminal. When the movement time taken for the client terminal to move from a present position of the client terminal to a position of the predetermined terminal or the delivery time taken for data to be delivered to the predetermined terminal is longer than the delivery time taken for data to be delivered to the client terminal, data is delivered to the client terminal. When the movement time taken for the client terminal to move from a present position of the client terminal to a position of the predetermined terminal or the delivery time taken for data to be delivered to the predetermined terminal is shorter than the delivery time taken for data to be delivered to the client terminal data is delivered to the predetermined terminal. When the movement time taken for the client terminal to move from a present position of the client terminal to a position of the predetermined terminal or the delivery time taken for data to be delivered to the predetermined terminal is long, data downloading operation is completed at the client terminal during the movement of the client terminal. Accordingly, in this case, it is better to deliver data to the client terminal since the data can be more quickly obtained at the client terminal, although the client terminal is temporarily used by the downloading operation.

Also when the delivery time taken for data to be delivered to the predetermined terminal is long, the downloading operation still continues even when the client terminal has moved to the predetermined terminal. It is impossible to quickly process the data at the client terminal. Accordingly, it is better to deliver data to the client terminal since the data can be more quickly obtained at the client terminal, although the client terminal is temporarily used by the downloading operation.

When the delivery time taken for data to be delivered to the client terminal is long, the downloading operation will be completed during the movement of the client terminal toward the predetermined terminal. Therefore, data can quickly be obtained at the client terminal, and data is delivered to the client terminal, whereby preventing such a disadvantage that a client terminal issuing a download request is exclusively used for a long time by the downloading operation.

The data delivery device of the invention further comprises a network status managing part for statistically managing a congestion status in a transmission channel every time zone, the comparing means for comparing the movement time with a delivery time which is set up in consideration of first delay times obtained by adding a delay time based on a congestion status in the transmission channel under management of the network status managing part to the first and second delivery times.

The first and second delivery times set up in consideration of the delay time in the network are obtained by the network status managing part. The first and second delivery times are compared with the movement time. Therefore, a more practical delivery time is used for the comparing operation, so that a delivery destination which enables one to obtain data at the client terminal more reliably and quickly, is determined.

In the invention, the present positions of a mobile body are managed. Data is delivered to the client terminal or another terminal on the basis of a position of the mobile body without a disadvantage that the client terminal is exclusively used by the data downloading operation.

BRIEF DESCRIPTION OF THE DRAWINGS

FIG. 7 is a table showing a database for predicting a movement time.

DESCRIPTION OF THE PREFERRED EMBODIMENTS

A detail construction and operation of the data delivery device and the method for delivering data according to the present invention will be described with reference to the accompanying drawings.

Figure 1:
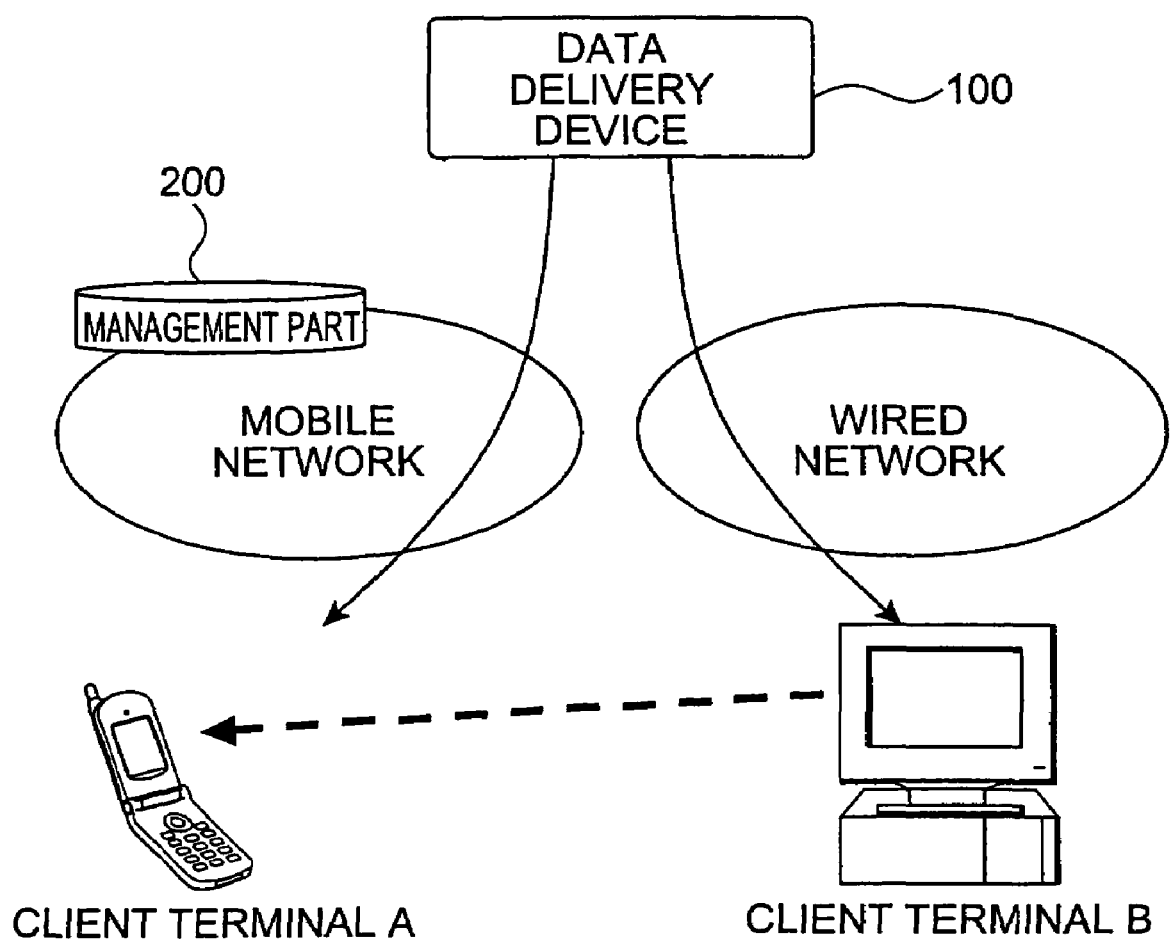
FIG. 1 is a diagram showing a concept of a network system according to the present invention.

FIG. 1 is a diagram showing a concept of a network system according to the present invention.

A data delivery device 100 is capable of delivering data to client terminals A and B respectively through a mobile network and a wired network.

The mobile network is a network allowing a client terminal A such as a cellular phone to perform data communication. A managing part 200 is installed on a mobile network. The managing part 200 stores location information to specify a position of the client terminal A on the basis of the GPS position measurement or the position measurement using a propagation time difference to the base station.

The wired network is a network allowing the client terminal B to perform data communication mainly by FTTH or ADSL.

The data delivery device 100 is able to switch a network for data delivery between those two networks. When data is delivered to the client terminal B, a user of the client terminal A manually connects the client terminal A to the client terminal B to allow the data to be delivered from the client terminal B to the client terminal A. A block arrangement and operations of the data delivery device 100 will be described hereunder.

Figure 2:
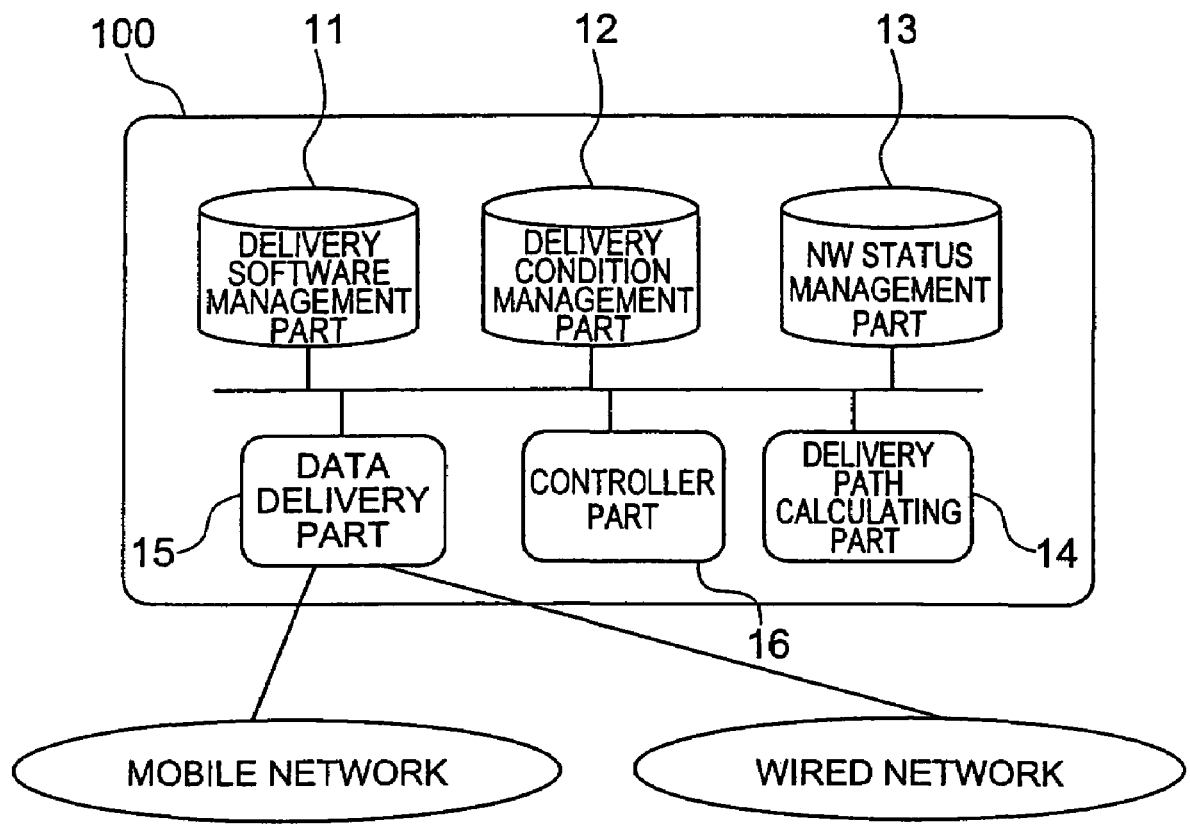
FIG. 2 is a block diagram showing a data delivery device 100 constructed according to the invention.

A block arrangement of the data delivery device 100 will first be described. FIG. 2 is a diagram showing, in block form, an arrangement of the data delivery device 100 constructed according to the invention. The data delivery device 100 of the invention includes a delivery software managing part 11 (storage means), a delivery condition managing part 12, an NW (network) status managing part 13 (network status managing means), a delivery path calculating part 14 (judging means (including comparing means and deciding means), a data delivery part 15 (receiving means and delivering means), and a controller part 16.

The delivery software managing part 11 stores the data sizes of application files and data files for delivering data files to the client terminal A or B, and further it stores the application files and data files per se.

The delivery condition managing part 12 stores in advance information on the client terminals A and B (for example, client names, types of networks, addresses, and IP addresses), and delivery condition in corresponding manner. The delivery condition contains information indicating any of train, bus and walking by which a user having the client terminal A moves. The ways to move are stored in connection with positions and time zones. Similar information on client terminals used by other users is also stored in addition to the client terminal A.

The NW status managing part 13 stores transmission delay times in the networks. In the embodiment, it stores transfer delay times in the wired and mobile networks at each time zone.

The delivery path calculating part 14 has a function to calculate a data delivery path The time (delivery completion time) taken till the delivering of data to the client terminal A through the mobile network is completed is compared with a time (movement time) taken for the client terminal A to move to a place where the client terminal B is positioned. When the delivery completion time is shorter than the movement time, data is delivered to the client terminal A When the delivery completion time is longer than the movement time, data is delivered to the client terminal B. To calculate a movement time, the delivery path calculating part 14 acquires the way to move, which is based on a present position of the client terminal A, from the delivery condition managing part 12, and calculates a movement time of the client terminal A. To calculate a delivery time taken to deliver data to the client terminal A, the delivery path calculating part 14 acquires a transmission delay time based on a time zone of the mobile network, from the NW status managing part 13, and calculates a more exact delivery time by adding the transmission delay time to the delivery time of delivering data to the client terminal A.

Alternatively, the longer of a delivery time (taken to deliver data to the client terminal B) and a movement time (taken for the client terminal A to move to a place where the client terminal B is located) is compared with a delivery time of delivering data to the client terminal A through the mobile network. When the longer of the delivery time (taken to deliver data to the client terminal B) and the movement time (taken for the client terminal A to move to a place where the client terminal B is located) is longer than the delivery time of delivering data to the client terminal A, data is delivered to the client terminal A through the mobile network. Further, when the longer of the delivery time (taken to deliver data to the client terminal B) and the movement time (taken for the client terminal A to move to a place where the client terminal B is located) is shorter than the delivery time of delivering data to the client terminal A, data is delivered to the client terminal B through the wired network. As described above, it is desirable to calculate the delivery time to which the transmission delay time is added for each network used when data is delivered.

The data delivery part 15 delivers data to a delivery destination determined by the delivery path calculating part 14. More specifically, it delivers data to the client terminal A or B through the wired network or the mobile network. In addition to the data delivery function, the data delivery part 15 has other functions: a function of giving a notice to the client terminal A or B, a function of receiving, from the client terminal A, instructions of registering and deleting position information of the client terminal B and altering the content thereof, a function of receiving download request from the client terminal A, and a function of receiving register and deletion of the delivery condition, and alteration of its content. Further, it has another function of receiving present position information of the client terminal A from a managing part 200.

The data delivery part 15 notifies the delivery condition managing part 12 of registering position information. Upon receipt of the notice, the delivery condition managing part 12 performs the registering, deleting, and content altering operations in the client terminal B. The delivery condition managing part 12 also performs the registering, deleting and content altering operations on the delivery condition.

The controller part 16 controls all of the delivery software managing part 11, the delivery condition managing part 12, the NW status managing part 13, the delivery path calculating part 14, and the data delivery part 15, reads out information from the managing parts 11 to 13, issues a calculation instruction to the delivery path calculating part 14, and controls the data delivery by the data delivery part 15.

Figure 3:
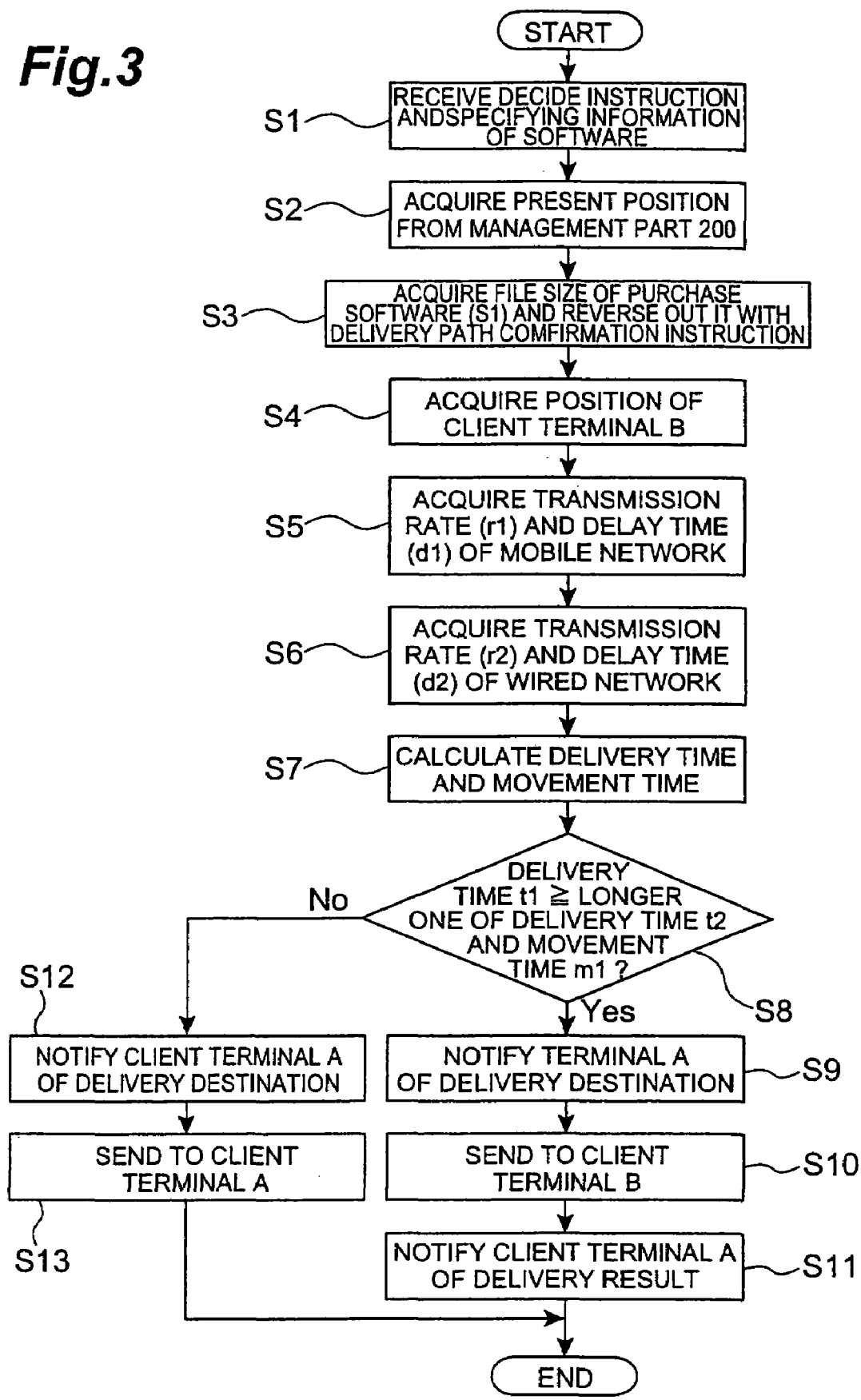
FIG. 3 is a flow chart showing operations of the data delivery device 100.
Figure 4:
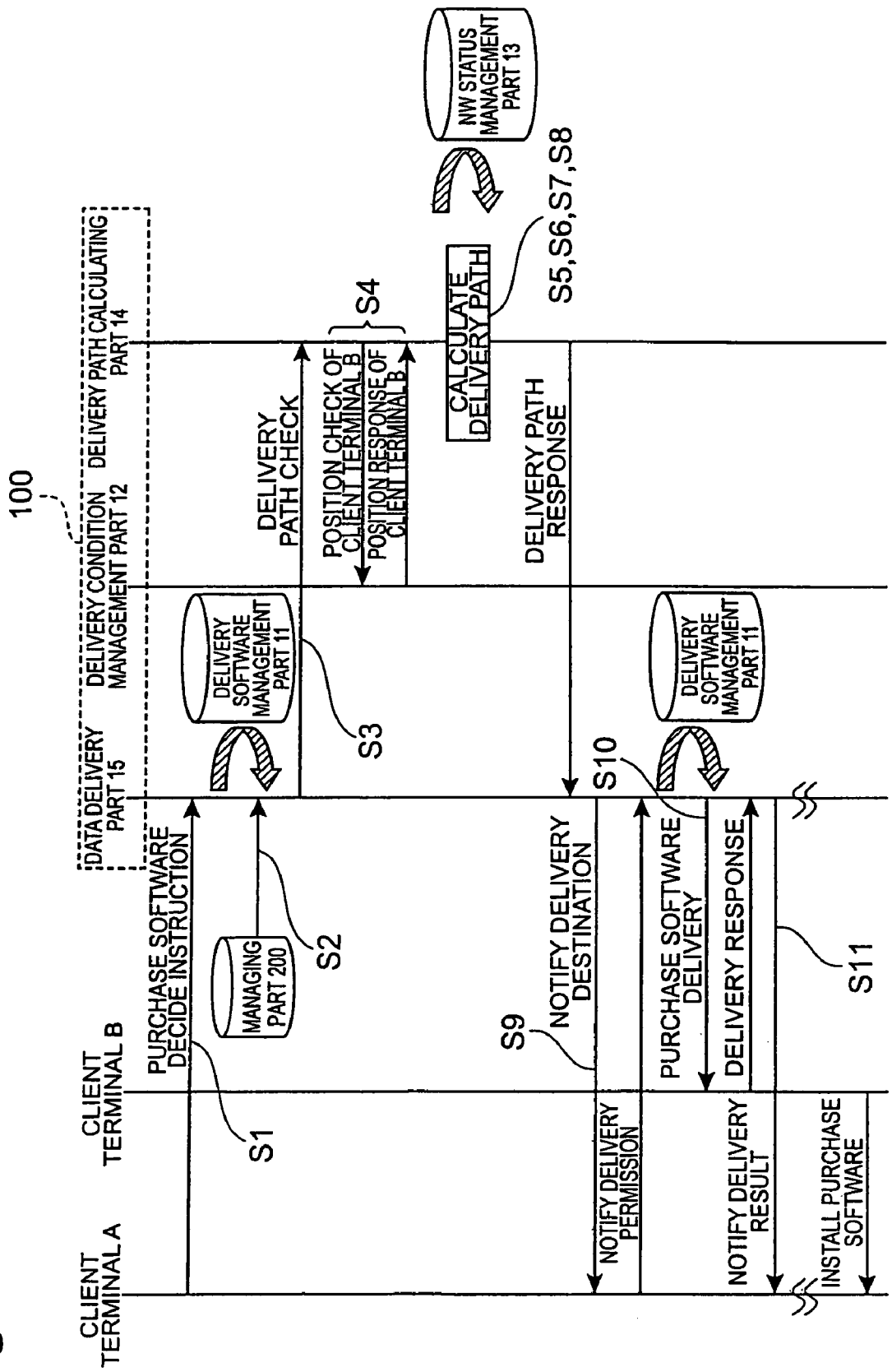
FIG. 4 is a sequential diagram showing a process of delivering data to a client terminal B.
Figure 5:
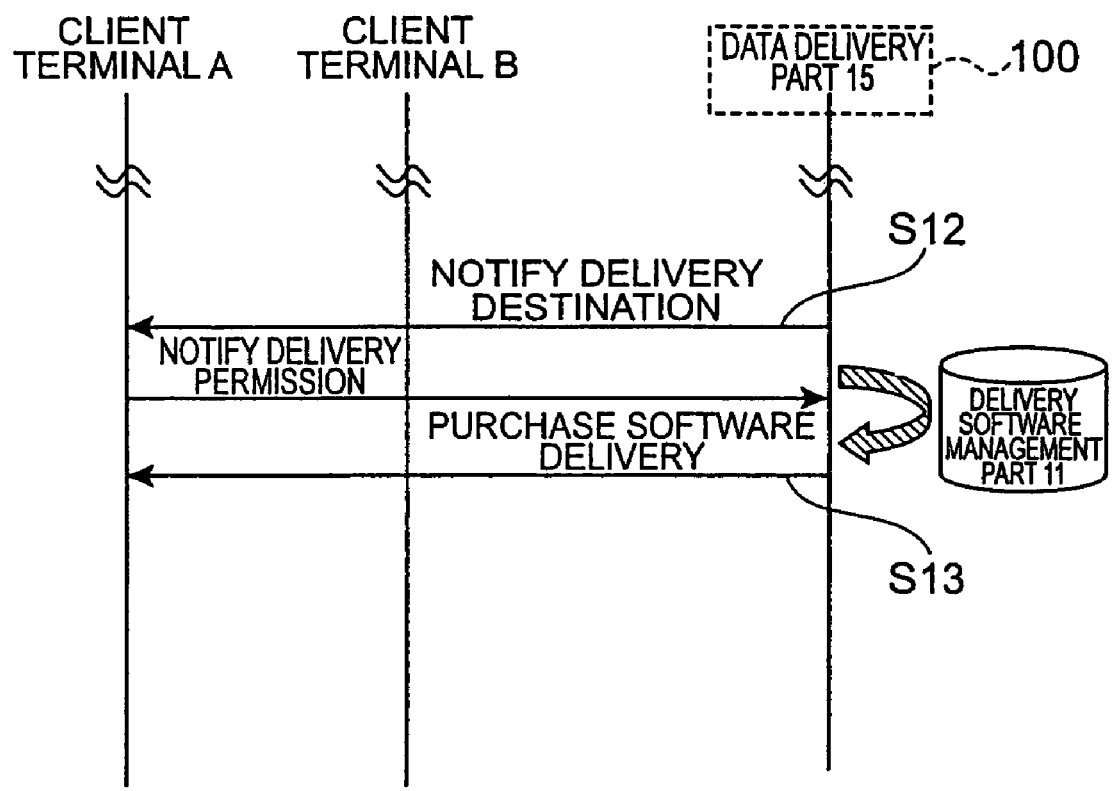
FIG. 5 is a sequential diagram showing a process of delivering data to a client terminal A.

Operations of the data delivery device 100 thus arranged will be described. FIG. 3 is a flow chart showing operations of the data delivery device 100. FIG. 4 is a sequence of operations of the data delivery device when it delivers data to the client terminal B. Operation description will be given with reference to both FIGS. 4 and 5.

The data delivery device 100 receives an instruction to determine a software to be purchased and information specifying the software, from the client terminal A (S1). Then, the data delivery part 15 receives and acquires present position information (longitude and latitude) of the client terminal A from the managing part 200 for managing a position of the client terminal A (S2). Upon receipt of the instruction signal, the data delivery part 15 acquires a file size of the software to be delivered on the basis of the software specifying information contained in the instruction signal from the delivery software managing part 11, and sends the acquired one to the delivery path calculating part 14. Further, the data delivery part 15 sends, as a delivery-path check instruction, information specifying the client terminal A (e.g., telephone number) and a present position (longitude and latitude) of the client terminal A to the delivery path calculating part 14 (S3).

Upon receipt of the delivery-path check instruction, the delivery path calculating part 14 reads out information on the client terminal B registered as the home of the client terminal A from the delivery condition managing part 12. The information on the client terminal B contains information specifying the client terminal B, the type of accessible network (mainly FTTH or ADSL (including transmission rate)), and an address (including the longitude and latitude of the address) representing the existing position, and an IP address (S4).

The delivery path calculating part 14 executes a process to select the delivery path by using the address representing the existing address of the client terminal B as one of the readout information. The delivery path calculating part 14 first accesses the NW status managing part 13, and acquires the transmission rates (r1 and r2) of the mobile network and the wired network and delay times (d1 and d2) in those networks (S5 and S6).

The delivery path calculating part 14 calculates delivery times taken for data to be transmitted to the client terminals A and B, and a time taken for the client terminal A to move to a place where the client terminal B is located by using those pieces of information (S7). Specifically, the delivery path calculating part 14 first calculates delivery times of the respective networks by using the file sizes 1 of the software and the transmission rates (r1 and r2) of those networks. (File sizes 1)/(transmission rate r1) is calculated to produce the delivery time in the mobile network, and (File sizes 1)/(transmission rate r2) is calculated to produce the delivery time in the wired network. The delivery path calculating part 14 accesses the NW status managing part 13, and acquires the transmission delay times d1 and d2 in the mobile network and the wired network in a time zone in which data delivery is to be performed. The delivery path calculating part 14 further adds the acquired transmission delay times to the calculated delivery times of the networks to thereby produce delivery times involving the delay times in the mobile network and the wired network.

To be more specific, the delivery path calculating part calculates the following equations.

For a delivery time involving the delay time in the mobile network, $$t1 = s1/r1 + d1 \quad (1)$$

For a delivery time involving the delay time in the wired network, $$t2 = s1/r2 + d2 \quad (2)$$

The delivery path calculating part 14 calculates a distance between a present position of the client terminal A and a position of the client terminal B indicated by position information of the same, which is stored in the delivery condition managing part 12. Then, the delivery path calculating part 14 calculates a movement time of the client terminal A by using the following equation:

$$\text{Movement time } m1 = \text{movement distance } e1/\text{average walking speed } t3 \text{ of a human being} \quad (3)$$

The distance e1 can be calculated from a longitude and a latitude of the client terminal A and those of the client terminal B. The distance e1 can also be calculated in a manner that approximate longitude and latitude are calculated from the address of the client terminal B, and then the distance is calculated by using those calculated longitude and latitude. The above equation holds on condition that the user of the client terminal A moves on foot. When the user moves by train or bus, the average walking speed of a human being t3 is replaced by an average movement speed of train or bus. The movement speed may be calculated by a combination of train, bus and walking. In this case, the delivery condition managing part 12 stores the ratios of train, bus and walking which are employed by the user when he/she moves, and are based on a present position of the client terminal, in corresponding manner. Then, the delivery path calculating part 14 calculates a movement time involving the ratios of train, bus and walking on the basis of the information stored in the delivery condition managing part 12. Use of the route search system based on the GPS, which is employed in the known car navigation system, will provide a more practical movement time.

The delivery path calculating part 14 compares the delivery time t2 in the wired network with the movement time m1, and compares the longer of the times t2 and m1 with the delivery time t1 on the mobile network (S8).

As will subsequently be described, the delivery path calculating part 14 determines a delivery destination on the basis of the comparison result, and sends information specifying an IP address and a client terminal, which are those of the delivery destination, to the data delivery part 15. In turn, the data delivery part 15 reads out the software to be delivered from the delivery software managing part 11, and starts a delivering operation.

Another method in which the delay times (d1 and d2) are not taken into account may be employed. The concrete deciding method, in the case of deciding the destination by comparing a delivery time (t1-d1) not involving the delay time with a delivery time (t2-d2) not involving the delay time, is as follows: When the delivery time t2 is longer than the delivery time t1, it is decided that data is delivered to the client terminal A through the mobile network. When the delivery time t1 is longer than the delivery time t2, it is decided that data is delivered to the client terminal B through the wired network.

In the step S8, when it is decided that the longer of the delivery time t2 and the movement time m1 is shorter than the delivery time t1, the delivery path calculating part 14 notifies the data delivery part 15 of the effect. In turn, the data delivery part 15 notifies the client terminal A of the effect that data will be delivered to the client terminal B (S9).

Upon receipt of a delivery permission from the client terminal A, the data delivery part 15 reads out the files of the software to be delivered from the delivery software managing part 11. Then, the data delivery part 15 delivers the data to the client terminal B as the delivery destination (S10).

When receiving a delivery response indicating delivery completion from the client terminal B, the data delivery part 15 notifies the client terminal A of the delivery result that the delivery to the client terminal B was completed (S11).

Subsequently, description will be given about a process of delivering data to the client terminal A. Reference is made to an operation flow chart shown in FIG. 3, and a sequential diagram shown in FIG. 6.

Figure 6:
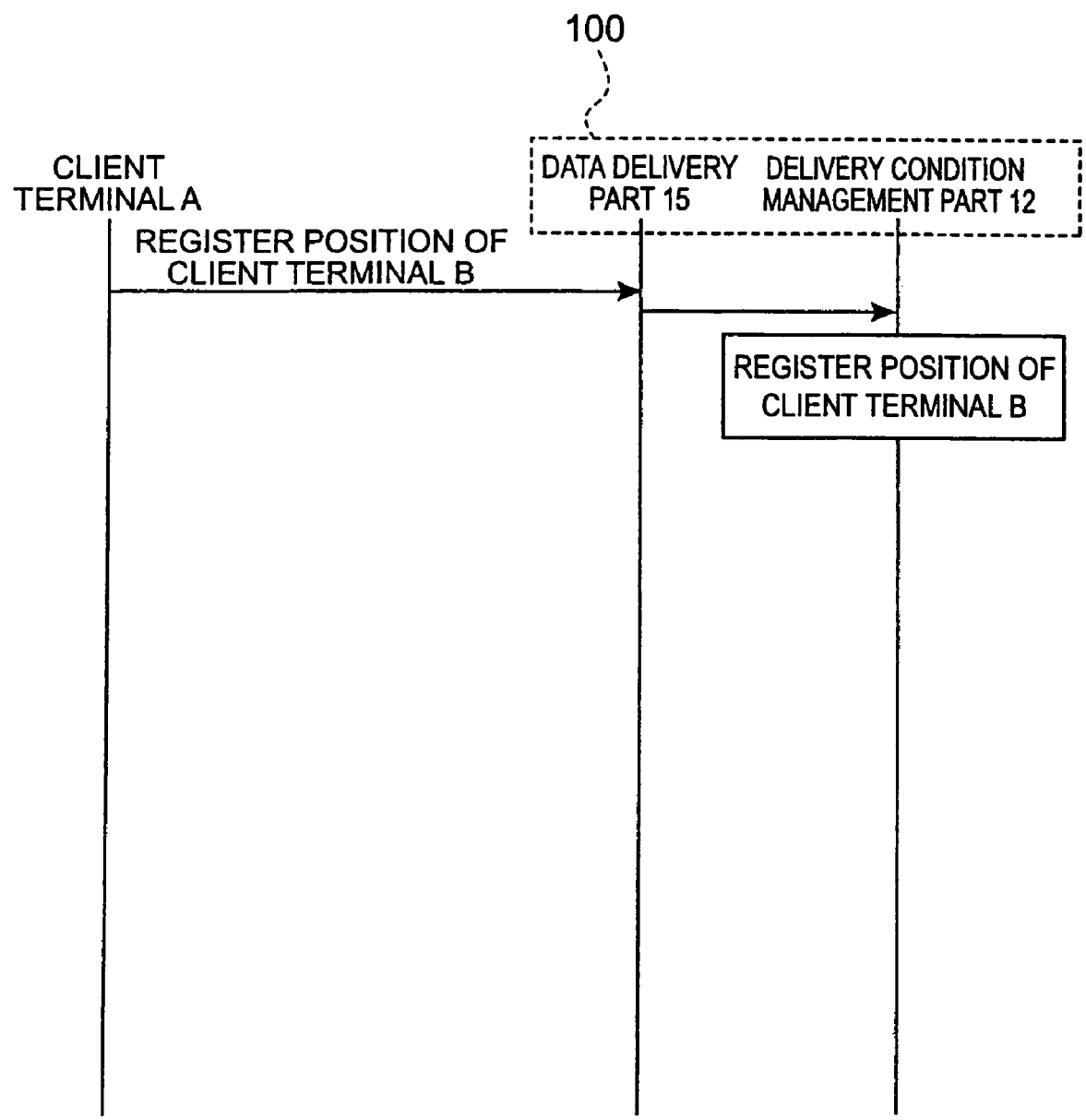
FIG. 6 is a sequential diagram showing a process of registering a location of the client terminal B.

FIG. 6 is a sequential diagram showing a process of delivering data to a client terminal A.

When it is decided that the delivery time t1 is shorter than the longer of the delivery time t2 and the movement time m1, the delivery path calculating part 14 notifies the client terminal A of the effect that data will be delivered to the client terminal A (S12). Upon receipt of a delivery permission from the client terminal A, the data delivery part 15 reads out the files of the software to be delivered from the delivery software managing part 11. Then, the data delivery part 15 delivers the data to the client terminal A as the delivery destination (S13).

The process carried out by the data delivery device 100, which has thus far been described, has the following useful effects. The best delivery destination is determined in consideration of a position of the client terminal A, the delivery times taken for the data delivery by using the mobile and wired networks, the delay times in those networks, and the movement time taken for the client terminal A to move to the client terminal B. The result is that there is no case that the client terminal A must continue the downloading operation for a long time, while suspending other operations. Where the broadband communication system is employed for the communication system for delivering data to the client terminal B, the downloading time per se is reduced and hence, traffic on the network is reduced.

A location of the client terminal B must be registered before the process of the invention is carried out An operation of registering the terminal location will be described hereunder.

FIG. 6 is a sequential diagram showing a process of registering a location of the client terminal B, which must be carried out before the process of the invention.

The registering process for the client terminal B is carried out at the client terminal A. The client terminal A sends the following information about the client terminal B to the data delivery device 100 of the invention: name of the client terminal B, type of the network, address (including longitude and latitude), and IP address. In the data delivery device 100, the data delivery part 15 receives and stores the above information in connection with information (including telephone number) specifying the client terminal A.

While the process of calculating a time taken for the user to move from the location of the client terminal A to the location of the client terminal B, which the calculating process is defined by the equation (3), was already discussed, another movement time calculating process will be described hereunder.

In the present embodiment, a future movement time is predicted on the basis of a past movement history, for example, a movement history on the previous day, by using GPS information for the position information. FIG. 7 is a table showing a database for predicting a movement time of a mobile device. The database is stored in the delivery condition managing part 12. When reaching a predetermined point, the client terminal A sends the longitude, latitude and time at the point of the client terminal to the data delivery device, and registers those pieces of information into the delivery condition managing part 12. The predetermined point is a point under management of a radio base station registered in advance. When the radio base station learns that the client terminal A has come in within a predetermined area, it detects the client terminal A, and sends the presence of the client terminal A, together with the information of the longitude, latitude and time, to the data delivery device 100.

The database contains GPS information registered therein. The GPS information contains the longitudes and the latitudes at points where the mobile device visited on the previous day, which are arrayed with respect to times. The data delivery device 100 learns a movement time taken for the client terminal A to move from a point to the point of the client terminal B (user's home), from the database.

When the user of the client terminal A downloads data at a point B, the data delivery device calculates a movement time taken for the user to move from the point B to his home by using the database shown in FIG. 7. In this example, time 16:46:00 is subtracted from time 17:30:00, and then the user can learn that it takes 44 minutes from the point B to his home. The movement time can be more exactly calculated by using this time. While previous day data is used in the example, it may be replaced with other various types of data, such as average data over a past one week.

As described, a movement time can be predicted on the basis of the past movement history stored, and the resultant prediction ensures a proper determination of the delivery destination.

What is claimed is:

1. A data delivery device comprising:
   storage means for storing data;
   receiving means for receiving, from a client terminal, a request to download data to be stored into the storage means and information indicative of a present position of the client terminal, through a network;
   judging means for judging, in response to the download request received by the receiving means, whether data to be stored into the storage means is to be transmitted to the client terminal or to another predetermined terminal on the basis of a present position of the client terminal; and
   delivery means for delivering the data to a terminal destination based on the result of judgment through the judging means,
   wherein the judging means includes:
   comparing means for comparing a data delivering time for delivering the data to the client terminal with a movement time taken for the client terminal to arrive at a location of the other predetermined terminal, and
   determining means for determining that the data is delivered to either the client terminal or the other predetermined terminal based on the comparison of the comparing means.

2. The data delivery device according to claim 1, wherein the determining means determines that the data is delivered to the other predetermined terminal when the comparing means judges that the data delivering time is longer than the movement time, and that the data is delivered to the client terminal when the comparing means judges that the data delivering time is shorter than the movement time.

3. The data delivery device according to claim 2, further comprising network status managing means for statistically managing a congestion status in a transmission channel for every time zone, the comparing means comparing the movement time with a delivery time set up in consideration of a delay time, which is obtained in a manner that a delay time based on the congestion status in the transmission channel under management of the network status managing means is added to the delivery time.

4. The data delivery device according to claim 1, wherein the comparing means compares a first delivery time for delivering the data to the client terminal with the longer of the movement time until the client terminal moves to the location of the other predetermined terminal and a second delivery time of delivering data to the other predetermined terminal, and
   the determining means delivers data to the other predetermined terminal when the comparing means judges that the first delivery time is longer than the longer of the movement time and the second delivery time, and for delivering data to the client terminal when the comparing means judges that the first delivery time is shorter than the longer of the movement time and the second delivery time.

5. The data delivery device according to claim 4, further comprising a network status managing means for statistically managing a congestion status in a transmission channel for every time zone, the comparing means for comparing the movement time with a delivery time which is set up in consideration of first delay times obtained by adding a delay time based on a congestion status in the transmission channel under management of the network status managing means to the first and second delivery times.

6. A method for delivering data, the method comprising:
   receiving a data download request from the client terminal through a network;
   judging, in response to the received download request, as to whether the received data is to be transmitted to the client terminal or another predetermined terminal on the basis of a present position of the client terminal; and delivering the data to the terminal based on the judgment result wherein the judging includes:

comparing a data delivering time for delivering the data to the client terminal with a movement time taken for the client terminal to arrive at a location of the other predetermined terminal, and determining that the data is delivered to either the client terminal or the other predetermined terminal based on the comparing.

7. A data delivery device comprising:

a storage unit configured to store data;

a receiving unit configured to receive, from a client terminal, a request to download data to be stored into the storage unit and information indicative of a present position of the client terminal, through a network;

a judging unit configured to judge, in response to the download request received by the receiving unit, whether data to be stored into the storage unit is to be transmitted to the client terminal or to another predetermined terminal on the basis of a present position of the client terminal; and a delivery unit configured to deliver the data to a terminal destination based on the result of judgment through the judging unit, wherein the judging unit includes:

a comparing unit configured to compare a data delivering time for delivering the data to the client terminal with a movement time taken for the client terminal to arrive at a location of the other predetermined terminal, and a determining unit configured to determine that the data is delivered to either the client terminal or the other predetermined terminal based on the comparison of the comparing unit.

* * * * *